(12) United States Patent
Thucanakkenpalayam Sundararajan

(10) Patent No.: US 12,045,167 B2
(45) Date of Patent: Jul. 23, 2024

(54) CONVERSION OF A CLEAN UNIQUE REQUEST TO A READ UNIQUE REQUEST BY A MEMORY COHERENCY MANAGER CIRCUIT

(71) Applicant: Synopsys, Inc., Mountain View, CA (US)

(72) Inventor: Karthik Thucanakkenpalayam Sundararajan, Fremont, CA (US)

(73) Assignee: Synopsys, Inc., Sunnyvale, CA (US)

( * ) Notice: Subject to any disclaimer, the term of this patent is extended or adjusted under 35 U.S.C. 154(b) by 47 days.

(21) Appl. No.: 17/962,232

(22) Filed: Oct. 7, 2022

(65) Prior Publication Data

US 2024/0119004 A1 Apr. 11, 2024

(51) Int. Cl.
| | |
|---|---|
| *G06F 12/00* | (2006.01) |
| *G06F 12/0815* | (2016.01) |
| *G06F 12/084* | (2016.01) |
| *G06F 12/0842* | (2016.01) |
| *G06F 12/0891* | (2016.01) |

(52) U.S. Cl.
CPC ...... *G06F 12/0842* (2013.01); *G06F 12/0815* (2013.01); *G06F 12/084* (2013.01); *G06F 12/0891* (2013.01)

(58) Field of Classification Search
None
See application file for complete search history.

(56) References Cited

U.S. PATENT DOCUMENTS

| | | | |
|---|---|---|---|
| 2017/0262372 A1* | 9/2017 | Tu | G06F 12/0831 |
| 2018/0373630 A1* | 12/2018 | Penton | G06F 12/084 |
| 2021/0342152 A1* | 11/2021 | Horsnell | G06F 9/3004 |
| 2022/0100659 A1* | 3/2022 | Galil | G06F 13/1668 |

* cited by examiner

*Primary Examiner* — Daniel D Tsui
(74) *Attorney, Agent, or Firm* — Patterson + Sheridan, LLP

(57) ABSTRACT

A system and method mitigates conflicts between clean unique requests by receiving a first clean unique request from a first processor core and a second clean unique request from a second processor core. The first clean unique request and the second clean unique request respectively indicate that the first processor core and second processor core request access to a first address of a memory. The memory is coupled to the first processor core and the second processor core. The first clean unique request and the second clean unique request are determined to be associated with the first address. Further, the second clean unique request is converted into a first read unique request based on determining that the first clean unique request and the second clean unique request are associated with the first address. The first read unique requests indicates that the second processor core requests data.

20 Claims, 8 Drawing Sheets

CONVERSION OF A CLEAN UNIQUE REQUEST TO A READ UNIQUE REQUEST BY A MEMORY COHERENCY MANAGER CIRCUIT

TECHNICAL FIELD

The present disclosure generally relates to a processor system, and more particularly to a system and method for converting clean unique requests to a read unique request by a memory coherency manager circuit.

BACKGROUND

A processing system may include a processor having multiple processor cores. The processor cores interact with a shared cache memory, writing and reading data from the shared cache memory. When multiple processor cores attempt to write the same line (block) within the shared memory, conflicts occur. A memory coherency manager circuit is used to mitigate the conflicts between the processor cores. For example, the coherency memory manager controls transactions between the processor cores and the shared cache memory to ensure that only one of the processor cores is writing (e.g., updating) to a line within the shared cache memory at a time. In many instances, the memory coherency manager circuit provides access to a line within the shared cache memory based on the order in which requests are received from the processor cores.

SUMMARY

In one example, a method includes receiving a first clean unique request from a first processor core and a second clean unique request from a second processor core. The first clean unique request and the second clean unique request respectively indicate that the first processor core and second processor core request access to a first address of a memory. The memory is coupled to the first processor core and the second processor core. The method further includes determining, within a memory coherency manager circuit, that the first clean unique request and the second clean unique request are associated with the first address. Further, the method includes converting the second clean unique request into a first read unique request based on determining that the first clean unique request and the second clean unique request are associated with the first address. The first read unique requests indicates that the second processor core requests data associated with the first address.

In one example, a processing system includes a memory, processor cores, and a memory coherency manager circuit. The processor cores are coupled to the memory. The processor cores include a first processor core and a second processor core. The first processor core outputs a first clean unique request associated with a first address within the memory. The first clean unique request indicates that that the first processor core requests access to the first address. The second processor core outputs a second clean unique request associated with the first address. The second clean unique request indicates that that the second processor core requests access to the first address. The memory coherency manger circuit receives the first clean unique request and the second clean unique request. Further, the memory coherency manager circuit determines that the first clean unique request and the second clean unique request are associated with the first address. The memory coherency manger further converts the second clean unique request into a first read unique request. The first read unique requests indicates that the second processor core requests data associated with the first address.

In one example, a memory coherency manager circuit receives a first clean unique request from a first processor core and a second clean unique request from a second processor core. The first clean unique request and the second clean unique request respectively indicate that the first processor core and second processor core request access to a first address of a memory coupled to the first processor core and the second processor core. The memory coherency manager circuit determines that the first clean unique request and the second clean unique request are associated with the first address. Further, the memory coherency manger circuit converts the second clean unique request into a first read unique request based on determining that the first clean unique request and the second clean unique request are associated with the first address. The first read unique requests indicates that the second processor core requests data associated with the first address.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
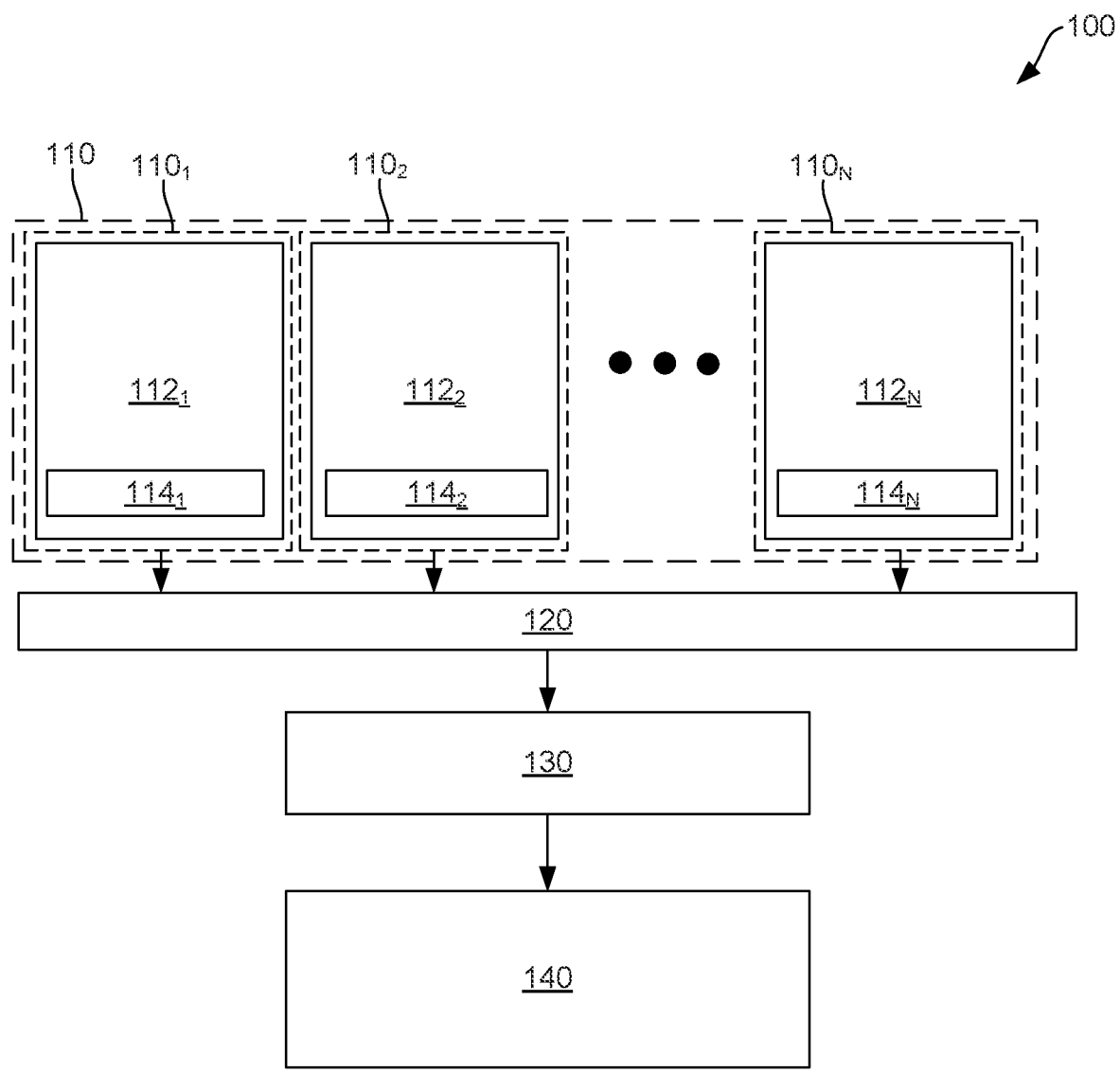
FIG. 1 illustrates a block diagram of a processing system, according to one or more examples.

Aspects of the present disclosure relate to conversion of clean unique requests to read unique requests by a memory coherency manager circuit.

Processing systems include a memory coherency manager circuit to mitigate memory transaction conflicts between processor cores of the processing system and cache memory shared among the processor cores (e.g., a shared cache memory), where the shared cache memory is coupled to processor cores. In one example, to execute a store instruction to a first address (e.g., an address line, an address block) within the shared cache memory, a processor core sends a clean unique request to the memory coherency manager circuit. The clean unique request provides an indication that the processor core is attempting to write data to the first address, and exclusive access by that processor core to the first address in the shared cache memory is requested. Exclusive access allows the processor core to write data (e.g., update) associated with the first address within the shared cache memory, and prevents the other processor cores from writing data to the first address. Accordingly, only one processor core is allowed to write data to an address at a time. The memory coherency manager circuit outputs (e.g., forwards or sends) the clean unique request to each of the other processor cores. The other processor cores invalidate local copies of the data associated with the first address, and send a null response to the memory coherency manager circuit. Invalidating the local copy of the data clears the data from a local cache memory of each processor core. Based on receiving the null response from each other processor core, the requesting processor core executes the corresponding store instruction as the processor core has exclusive access to the indicated address.

However, in an instance where two or more processor cores attempt to write data to the same address within the shared cache memory, a conflict occurs. The memory coherency manager circuit mitigates the conflict by allowing access to the requested address within the shared address to the requesting processor cores one at a time. However, such a process is time intensive, as multiple clean unique requests and read unique requests are sent between each of the requesting processor cores and the memory coherency manager circuit. A read unique request provides an indication that a processor core is attempting to write data to an address or addresses of a shared memory. A read unique request is used when a processor core is writing to an address of a shared memory and data associated with the address is not available within the cache memory of the processor core. In an instance where four different processor cores send a clean unique request for the same address within the shared cache memory, the memory coherency manager circuit processes the clean unique request that was received first. Processing the clean unique request of a first processor core includes sending the clean unique request to each of the other processor cores, and receiving a null response from each of the other processor cores. The null responses (or a combined null) response is then sent to the processor core, indicating that the processor core is able to execute the corresponding store instruction. After servicing the first clean unique request, the processor cores associated with non-serviced clean unique requests send a read unique request to obtain the updated data for the requested address. The updated data is the data written by the first processor core. Accordingly, when conflicting clean unique requests occur, to service the conflicting clean unique requests four transactions (e.g., a clean unique request, a clean unique response, a read unique request and a read unique response) are used between the processor cores and the memory coherency manager circuit. As the number of processor cores within a processing system increases, conflicting clean unique requests increase the processing time used to service memory transactions, reducing the processing speed of the corresponding processing system.

In contrast, the present disclosure describes a circuit and a method for detecting and mitigating conflicts between clean unique requests between processors and a shared memory. For example, a processing system includes a memory coherency manager circuit that receives clean unique requests from processors. Based on the determination that two or more of the clean unique requests are for the same address of a shared memory (e.g., the clean unique requests are conflicting), the memory coherency manager circuit processes and services the clean unique requests that was received first, and converts each subsequently received conflicting clean unique request into read unique requests. The converted read unique requests are processed and serviced in the order that the corresponding clean unique requests were received.

Technical advantages of the present disclosure include, but are not limited to, reducing the number of transactions between processor cores and a memory coherency manager circuit by converting conflicting clean unique requests to read unique requests within the memory coherency manager circuit. Reducing the number of transactions, improves the processing speed of the corresponding processing system, allowing the processing system to execute more memory transactions in a smaller period of time.

FIG. 1 illustrates a schematic block diagram of a processing system 100, according to one or more examples. The processing system 100 may be configured similar to the computer system 800 of FIG. 8. In one example, the processing system 100 includes processor cores 110, an interconnect 120, a memory coherency manager circuit 130, and a memory 140. In one example, each of the processor cores 110 are connected to the memory coherency manager circuit 130 via the interconnect 120. Further, the memory coherency manager circuit 130 is connected to the memory 140.

The processing system 100 includes one or more integrated circuit (IC) chips. In one example, the processing system 100 includes one or more field programmable gate arrays (FPGAs) and/or application specific ICs (ASICS), among others. In one example, the processing system 100 is a system on chip (SoC). In one example, the processor cores 110, the interconnect 120, the memory coherency manager circuit 130, and the memory 140 are included within a common package. In another example, one or more of the interconnect 120, the memory coherency manager circuit 130, and the memory 140 is included within a package separate from that of the processor cores 110.

The processor cores 110 includes one or more processor cores (e.g., the processor cores $110_1$-$110_N$, where N is greater than one). Each of the processor cores 110 include a processor 112, which includes a cache memory 114. In one example, the processor 112 is a central processing unit (CPU). In another example, the processor 112 is a 32-bit or a 64-bit reduced instruction set computer (RISC) processor. In other examples, other types of processors may be used. For example, the processor 112 may be a digital signal processor (DSP). In one or more examples, the processor 112 may be configured similar to the processor device 802 of FIG. 8.

The cache memories 114 are one or more of instruction cache memories and data cache memories. The cache memories 114 may be a level one cache (e.g., primary cache or processor cache) memories that are part of a respective one of the processors 112. In another example, the cache memories 114 are external from the processors 112, and coupled to a respective one of the processors 112. Each of the cache memories 114 has a size of one or bytes. In one example, each of the cache memories 114 has a size of 16 kilobytes (KB), 32 KB, 64 KB, or more.

In one example, each of the cache memories 114 stores data accessed from the memory 140 by a respective one of the processors 112. The data corresponds to addresses (e.g., address lines, address blocks) within the cache memories 114.

The processor cores 110 are connected to an interconnect 120. The interconnect 120 may be a communication bus, or other logic circuitry that is able to communicate data from the processor cores 110 to the memory coherency manager circuit 130 and the memory 140.

The interconnect 120 connects the processor cores 110 to the memory coherency manager circuit 130. The memory coherency manager circuit 130 provides input/output coherency between the memory 140 and the processor cores 110. In one or more examples, the memory coherency manager circuit 130 ensures the consistency of shared data between the cache memories 114 and the memory 140. In one example, the memory coherency manager circuit 130 ensures that data associated with an address of the memory 140 in each of the cache memories 114 has the same value. For example, when a first processor 112 modifies data of an address within the memory 140, the memory coherency memory circuitry 130 communicates the modified data to each of the other processors 112 before the other processors 112 further modified the modified data. Further, the memory coherency manager circuit 130 ensures that as processors 112 execute store instructions (e.g., a write command) to the memory 140, the data stored in each of the cache memories 114 remains valid (e.g., includes the most recent changes). The memory coherency manager circuit 130 further mitigates conflicts that may occur between the store instructions of different ones of the processor cores 110. For example, when two or more of the processor cores 110 attempt to execute a store instruction (e.g., write data to) the same address within the memory 140, the memory coherency manager circuit 130 prevents two or more of the processor cores 110 from writing to the same address within the memory 140.

The memory 140 is a memory that is shared among the processor cores 110 via the interconnect 120, and the memory coherency manager circuit 130. In one example, the memory 140 is a cache memory. For example, the memory 140 is a level two cache memory. The memory 140 may be referred to as an external cache or a secondary cache. The memory 140 is larger than the cache memories 114. In one example, the memory 140 has a size of 16 KB, 32 KB, 64 KB, or more.

In one example, to execute a store instruction, a processor core 110 sends a clean unique request to the memory coherency manager circuit 130 to ensure that the processor core 110 has exclusive access to the target address of the store instruction. In one example, each of the processor cores $110_1$, $110_2$, $110_3$, and $110_4$ issues a clean unique request to the memory coherency manager circuit 130 to execute a corresponding store instruction associated with a first address within the memory 140. The clean unique requests are stored within a buffer (or other memory element) within the memory coherency manager circuitry 130 based on the order in which the clean unique requests are received. A clean unique request may be encoded as "1001" for communication between the processor cores 110 and the memory coherency manager circuit 130. In other examples, other encodings may be used for the clean unique requests. The cache memory 114 of each of the processor cores $110_1$, $110_2$, $110_3$, and $110_4$ (e.g., the cache memories $114_1$, $114_2$, $114_3$, and $114_4$) store a respective local copy of the data associated with the first address within the memory 140. The memory coherency manager circuit 130 receives the clean unique requests from each of the processor cores $110_1$, $110_2$, $110_3$, and $110_4$, and processes the clean unique requests based on the order received. In one example, the clean unique request is received in the order of the processor core $110_1$, the processor core $110_2$, the processor core $110_3$, and then the processor core $110_4$. Accordingly, the clean unique request associated with the processor core $110_1$ is processed before that of the processor cores $110_2$, $110_3$, and $110_4$. Processing the clean unique request associated with the processor core $110_1$ includes sending a clean unique response to each of the processor cores $110_2$, $110_3$, and $110_4$. Each of the processor cores $110_2$, $110_3$, and $110_4$ invalidates (e.g., clears or deletes) the respective copy of the data within the cache memories $114_2$, $114_3$, and $114_4$, and provides a signal to the memory coherency manager circuit 130 to indicate that the local copy of the data has been invalidated. The memory coherency manager circuit 130 sends a null response to the processor core $110_1$, indicating that each of the local copies of the data associated with the processor cores $110_2$, $110_3$, and $110_4$ have been invalidated, and that the processor core $110_1$ is able to execute the corresponding store command to the memory 140.

To complete the clean unique requests for each of the processor cores $110_2$, $110_3$, and $110_4$, in one example, each of the processor cores $110_2$, $110_3$, and $110_4$ communicates a read unique request to the memory coherency manager circuit 130 to obtain the most recently updated version of the data within the first address. The read unique request indicates that the cache memories $114_2$, $114_3$, and $114_4$ of the processor cores $110_2$, $110_3$, and $110_4$ lack data associated with the first address. The read unique requests are output from each of the other processor cores $110_2$—$110_4$, and a read unique response is output to each of the other processor cores $110_2$-$110_4$ from the memory coherency manager circuit 130. A read unique request may be encoded as "1010" for communication between the processor cores 110 and the memory coherency manager circuit 130. In other examples, other encodings may be used for the read unique requests.

In the example as described above, when conflicts exists between the store instructions of the processor cores 110, e.g., two or more of the store instructions have the same target address within the memory 140, multiple clean unique requests and multiple read unique requests are communicated between the memory coherency manager circuit 130 and the processor cores 110. However, such a process is complicated and processing time intensive, reducing the operating speed of the corresponding processing system (e.g., the processing system 100). Based on the example above, to service the clean unique requests for each of the processor cores $110_2$, $110_3$, and $110_4$, four transactions (e.g., a clean unique request, a clean unique response, a read unique request, and a read unique response) between the memory coherency manager circuit 130 and the processor cores $110_2$, $110_3$, and $110_4$ are used.

In one example, to reduce the number of transactions, the memory coherency manager circuit 130 converts one or more of the conflicting clean unique requests to a read unique request based on detecting conflicting clean unique requests, e.g., two or more clean unique requests associated with the same address of the memory 140. Converting a conflicting clean unique request, or requests, to read unique requests within the memory coherency manager circuit 130 reduces the number of transactions between the processor cores 110 and the memory coherency manager circuit 130, reducing the processing time used to process the store instructions of the processor cores 110, and increasing the operating speed of the processing system 100.

Figure 2:
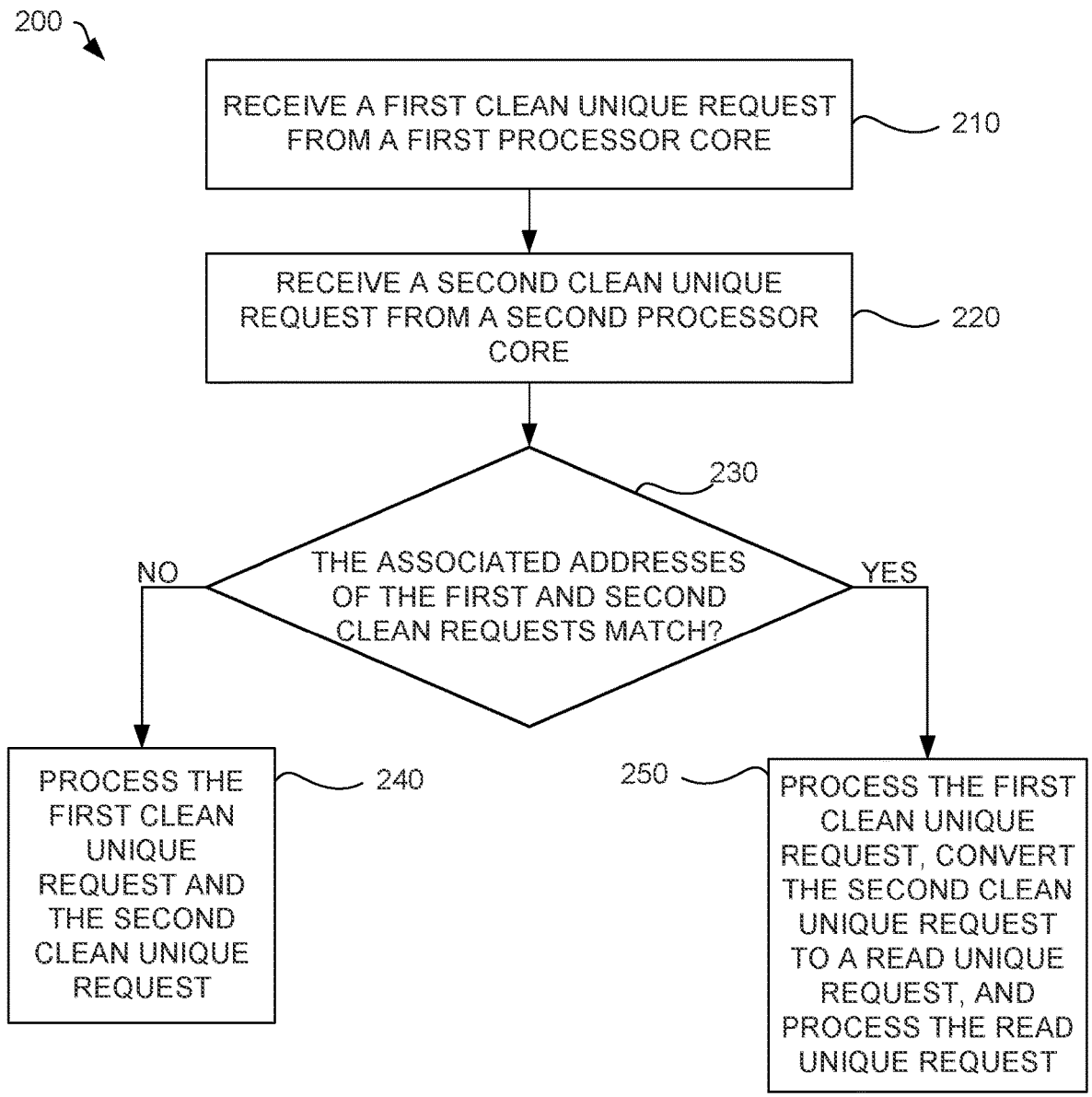
FIG. 2 depicts a flowchart of a method for processing transactions between processor cores and a memory coherency manager circuit, according to one or more example.
Figure 4:
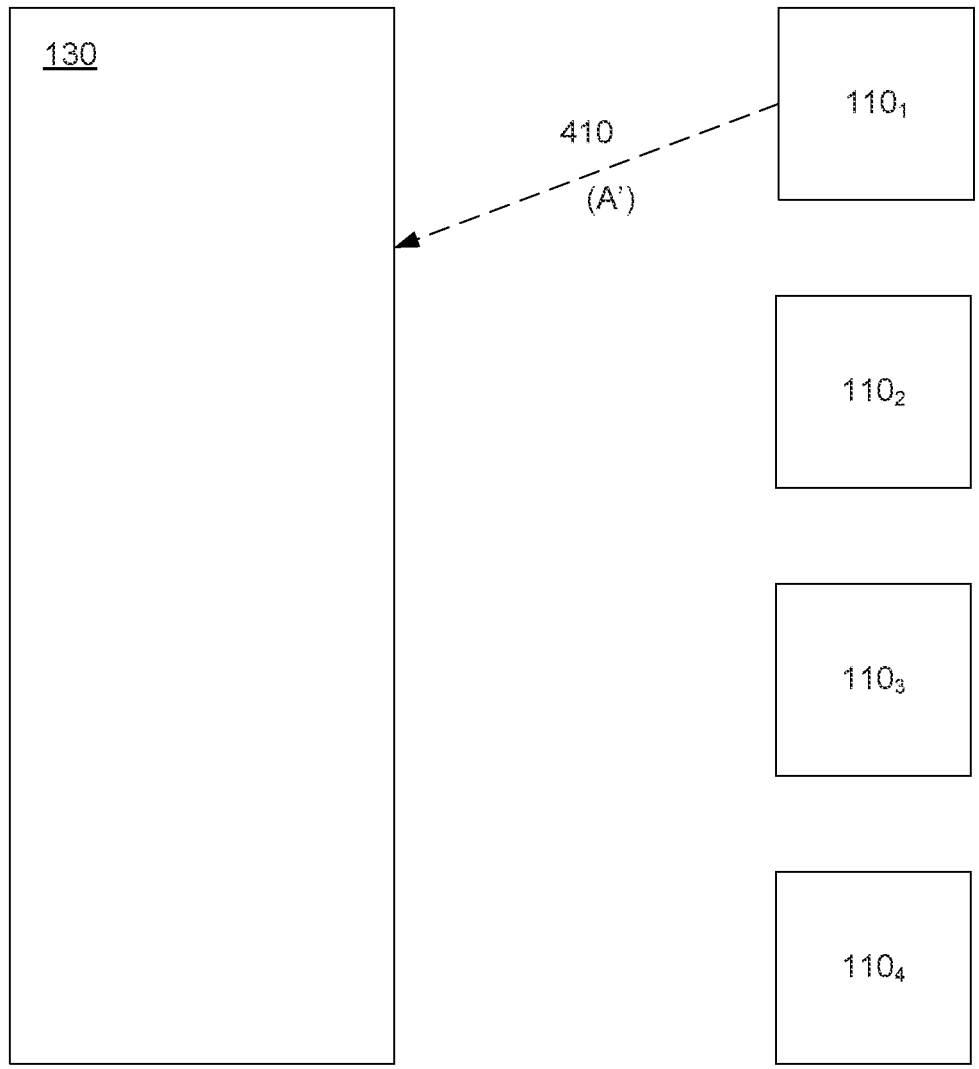
FIGS. 4, 5, 6, and 7 depict different transactions between processor cores and the memory coherency manager circuit.

FIG. 2 illustrates a flowchart of a method 200 of processing memory transactions (e.g., store instructions and/or load instructions), according to one or more examples. The method 200 is performed by the processing system 100 of FIG. 1, according to one embodiment. At 210, a clean unique request is received from a first processor core. The first clean unique request is received during a first period. For example, as illustrated in FIG. 4, the memory coherency manager circuit 130 receives a first clean unique request 410 from the processor core $110_1$ during period $T_1$. The first clean unique request 410 is stored within a memory element of the memory coherency manager circuit 130. The first clean unique request 410 is for an address (e.g., an address line) within the memory 140 at address A'. In one example, the core $110_1$ outputs the first clean unique request 410 based on a committed store instruction within the processor core $110_1$. The committed store instruction has a target address of A' within the memory 140. The processor core $110_1$ outputs the first clean unique request 410 to the memory coherency manager circuit 130 to ensure that the processor core $110_1$ has exclusive access to the memory block associated with address A'.

Figure 5:
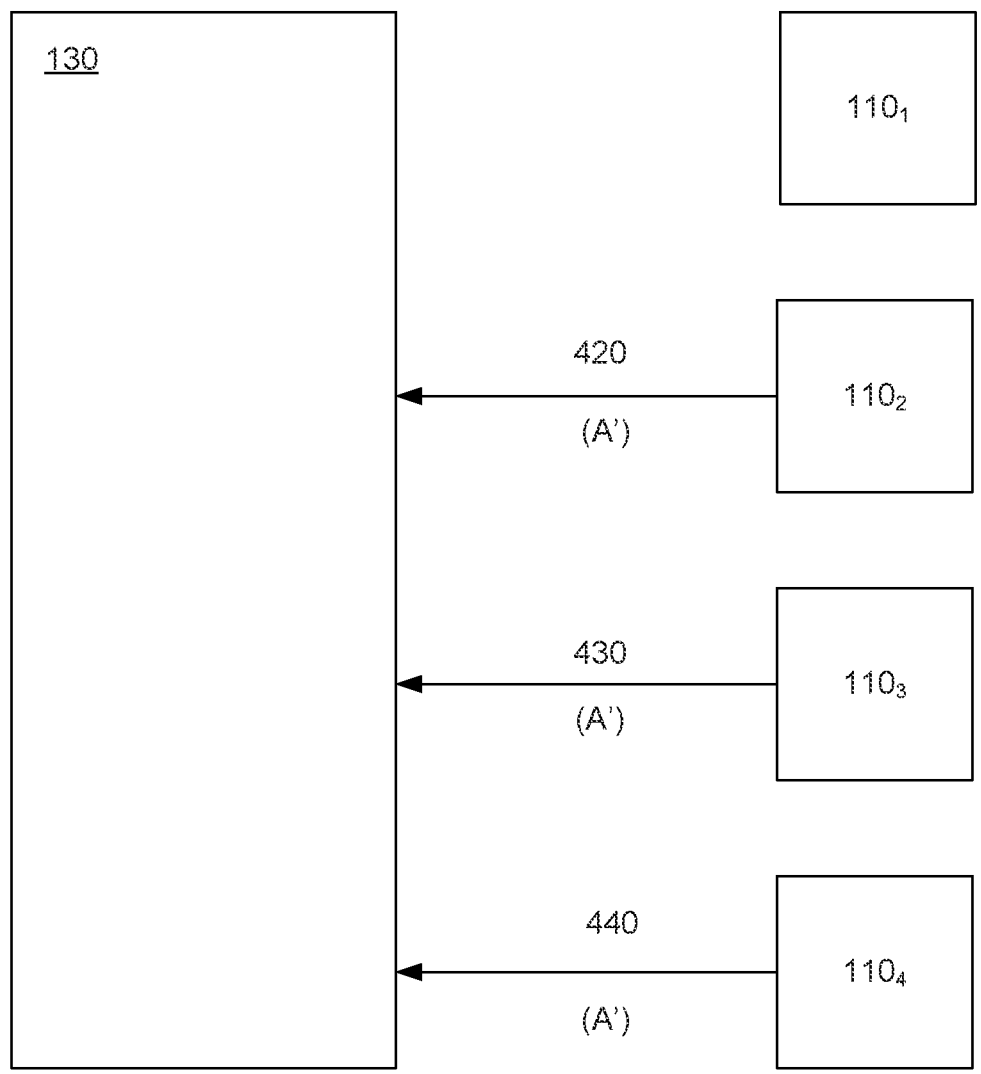

At 220, a second clean unique request is received from a second processor core during a second period. For example, as illustrated in FIG. 5, the memory coherency manager circuit 130 receives a second clean unique request 420 from the processor core $110_2$ during the period $T_2$. The period $T_2$ occurs subsequent to the period $T_1$. The second clean unique request 420 is stored within a memory element of the memory coherency manager circuit 130. In one example, the second clean unique request 420 is for the address line (e.g., an address block) within the memory 140 at address A'. In one example, the core $110_2$ outputs the second clean unique request 420 based on a committed store instruction within the processor core $110_2$. The committed store instruction has a target address of A' within the memory 140. In one example, the processor core $110_3$ outputs a third clean unique request 430 during the period $T_3$, and the processor core $110_4$ outputs a fourth clean unique request 440 during the period $T_4$. The period $T_3$ is subsequent to the period $T_2$, and the period $T_4$ is subsequent to the period $T_3$. The clean unique requests 430 and 440 are for the block of the memory 140 at the address A'. The processor cores $110_3$ and $110_4$ output the clean unique requests 430 and 440 similar to how the processor cores $110_1$ and $110_2$ output the clean unique requests 410 and 440 as described above.

In one example, as each of the clean unique requests 410-440 are associated with the same address (e.g., pointing to the same line) within the memory 140, the clean unique requests are serialized and processed by the memory coherency manager circuit 130 based on the order in which the clean unique requests were received. For example, the first clean unique request 410 is processed before the second clean unique request 420, which is processed before the third clean unique request 430, which is processed before the fourth clean unique request 440.

At 230, a determination as to whether or not there is a match between the addresses associated with the first and second clean unique requests. For example, the memory coherency manager circuit 130 compares the address associated with each of the clean unique requests 410 and 420. If at 230, a determination that the address associated with the second clean unique request 420 (e.g., the second clean unique request) does not match that of the first clean unique request 410 (e.g., the first clean unique request), the method 200 proceeds to 240. At 240 of the method 200, the first clean unique request and the second clean unique request are processed. For example, with reference to FIG. 4, processing the first clean unique request includes sending a clean unique response to the processor core $110_1$. The clean unique response is a null response indicating that no other processor core 110 is attempting to write to the same address (e.g., an address block, an address line) within the memory 140, and the processor core $110_1$ can execute (e.g., complete) the corresponding committed store instruction, writing data to the address in the memory 140. Further, processing the second clean unique request includes sending a clean unique response to the processor core $110_2$.

If at 230, a determination that the address associated with the second clean unique request 420 matches that of the first clean unique request 410, the method 200 proceeds to 250. In one example, at 230, the memory coherency manager circuit 130 determines that the first clean unique request 410 and the second clean unique request 420 are associated with the address A' within the memory 140. Accordingly, as each clean unique request 410 and 420 is for the same address (or block or line) within the memory 140, a conflict is determined. Further, in one or more examples, the memory coherency manager circuit 130 determines that the address associated for the clean unique requests 430 and 440 (e.g., the address A') matches that of the first clean unique request 410, determining additional conflicts.

Figure 6:
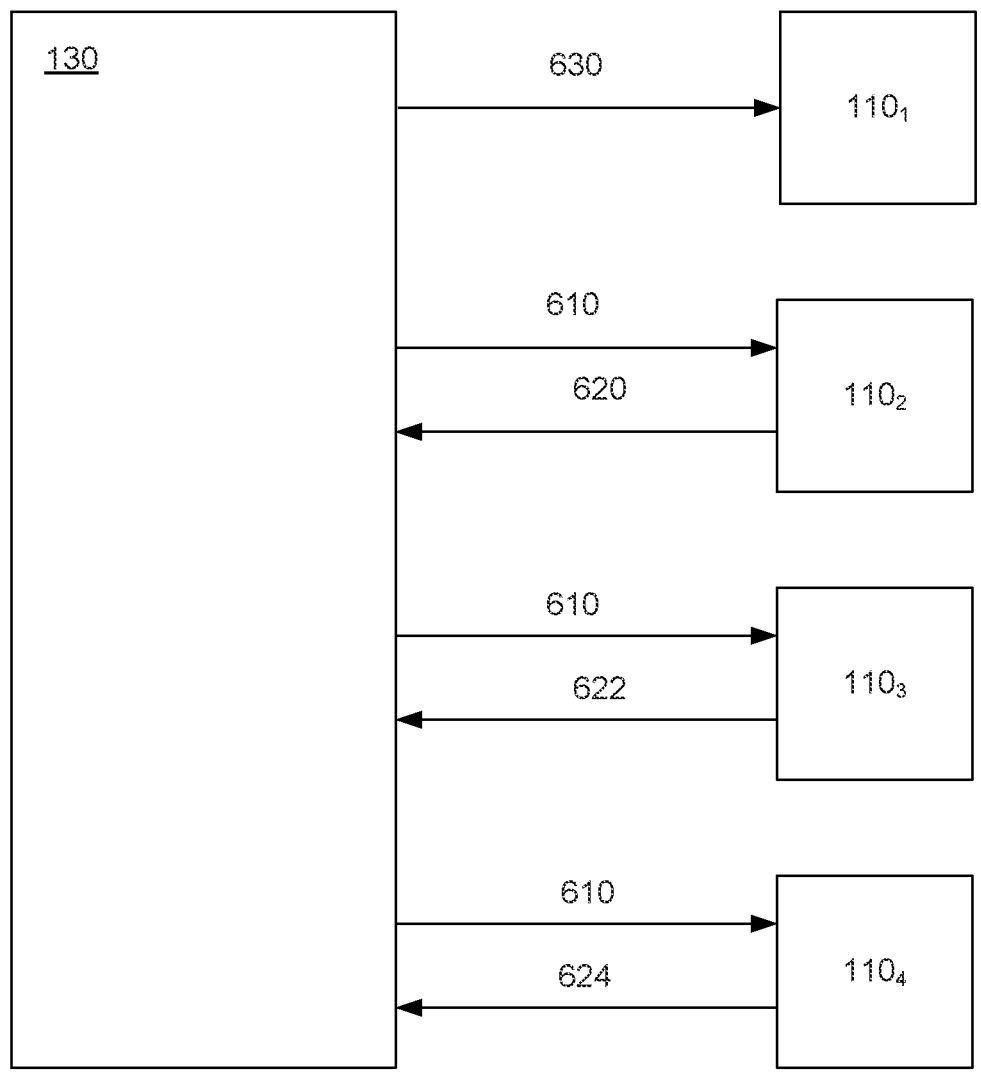

At 250, the first clean unique request is processed, the second clean unique request is converted into a read unique request, and the read unique request is processed. In one example, converting a clean unique request to a read unique request comprises converting the encoding of the clean unique request to that of a read unique request, and storing the updated encoding. In one example, 250 of the method 200 includes 310 of the method 300, sending the first clean unique request to the second processor core. In one example, as illustrated in FIG. 6, the memory coherency manager circuit 130 communicates the first clean unique request 410 to the processor core $110_2$. Further, the first clean unique request 410 is communicated to the processor cores $110_3$ and $110_4$. The first clean unique request 410 may be sent to each of the processor cores $110_2$-$110_4$ other than the processor core $110_1$.

At 320, the data associated with the second memory transaction is invalidated within the cache memory of the second processor core, and the second processor core sends a null response to the memory coherency manager circuit. For example, the processor core $110_2$ invalidates (e.g., clears) the data associated with address A' stored within the cache memory $114_2$ based on receiving the first clean unique request 610 from the memory coherency manager circuit 130. In one example, the first clean unique request 610 is the first clean unique request 410 output by the processor core $110_1$ to the memory coherency manger circuit 130. The processor core $110_2$ sends the null response 620 to the memory coherency manager circuit 130 based on invalidating the local copy of the data. Further, the processor cores $110_3$ $110_4$ invalidate the local copies of the data at address A' stored within the cache memory $114_3$ and $114_4$ based on the first clean unique request 610, and send null responses 622 and 624 to the memory coherency manager circuit 130.

At 330, a null response is sent by the memory coherency manager circuit to the first processor core, and the first processor core executes the first store instruction. For example, as illustrated in FIG. 6, the memory coherency manager circuit 130 sends the null response 630 to the processor core $110_1$, indicating that the processor core $110_2$ has invalidated the local copy of the data associated with address A' of the memory 140, and that the processor core $110_1$ has exclusive access to the data associated with address A' of the memory 140. The memory coherency manager circuit 130 sends the null response 630 based on receiving the null response 620. In one example, the null response 620 and the null response 630 are the same. In such an example, the memory coherency manager circuit 130 functions as a pass-through, receiving the null response 620, and outputting the null response 620 as the null response 630 to the processor core $110_1$. In one example, the memory coherency manager circuit 130 outputs a null response for each null response received from the other processor cores $110_2$-$110_4$.

For example, the memory coherency manager circuit 130 outputs a null response to the processor core $110_1$ corresponding to the null responses 622 and 624. Based on receiving a null response from each of the other processor cores $110_2$-$110_4$, the processor core $110_1$ executes the committed store instruction, writing data to the address A' within the cache memory $114_1$. Accordingly, the data at address A' within the cache memory $114_1$ differs from that within the cache memories 114 of the processor cores $110_2$-$110_4$.

At 340, the second clean unique request is converted to a read unique request, and the read unique request is sent to the first processor core. For example, with reference to FIG. 7, the memory coherency manager circuit 130 converts the second clean unique request 420 to a first read unique request 710, and outputs the first read unique request 710 to the processor core $110_1$. Converting the second clean unique request 420 to a first read unique request 710 includes modifying the encoding the second clean unique request 420 to reflect that of a read unique request (e.g., the first read unique request 710). In one example, a clean unique request is encoded as "1001" and a read unique request is encoded as "1010". In such an example, converting the clean unique request 420 to the read unique request 710 includes modifying the encoding of the clean unique request 420 to be "1010" from "1001" by the memory coherency manager circuit 130. Further, the first read unique request 710 is output to the processor cores $110_3$-$110_4$. In one example, the processor core $110_2$ is prepared to receive data from the one or more of the other processor cores 110. The processor core $110_2$ may be set to a data receive mode, or prepared in some other way.

Figure 7:
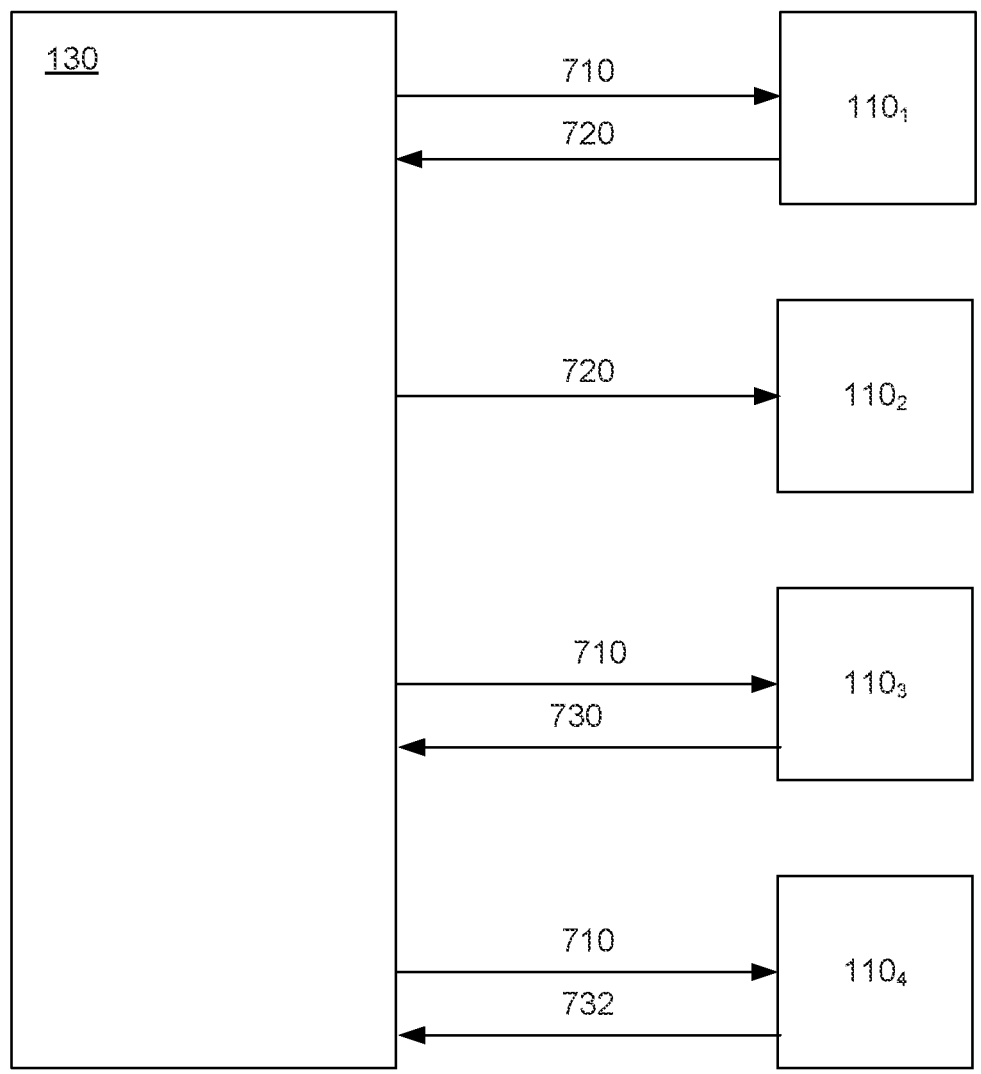

At 350, the data associated with the first address within the cache memory of the first processor core is communicated from the first processor core to the second processor core, and the first processor core invalidates the data. For example, based on receiving the first read unique request 710, the processor core $110_1$ communicates the data associated with address A' to the cache memory $114_2$ of the processor core $110_2$, and invalidates the data associated with the address A' stored within the cache memory $114_1$. In one example as illustrated in FIG. 7, the processor core $110_1$ outputs the data 720 to the memory coherency manager circuit 130, and the memory coherency manager circuit 130 outputs the data 720 to the processor core $110_2$. In one example, the processor core $110_1$ outputs the data 720 directly to the processor core $110_2$, or to the processor core $110_2$ without first passing through the memory coherency manager circuit 130. Further, the processor cores $110_3$ and $110_4$ respectively output the null responses 730 and 732 based on receiving the first read unique request 710, as the respective local copies of the data associated with address A' have been invalidated and do not have data associated with address A'. The data 720, which is stored within the cache memory $114_1$ of the processor core $110_1$ is considered dirty as the data is stored in only one memory cache.

At 360, the store instruction of the second processor core is executed. For example, the processor core $110_2$ writes data to the address A' within the memory 140 to execute the committed store instruction. The processor core $110_2$ updates the cache memory $114_2$ based on the received data 720 from the processor core $110_1$. The cache memory $114_2$ of the processor core $110_2$ is further modified at address A' based the data of the committed store instruction. Accordingly, the cache memory $114_2$ at address A' is modified as compared to the cache memories of the processor cores $110_1$, $110_3$, and $110_4$.

Figure 3:
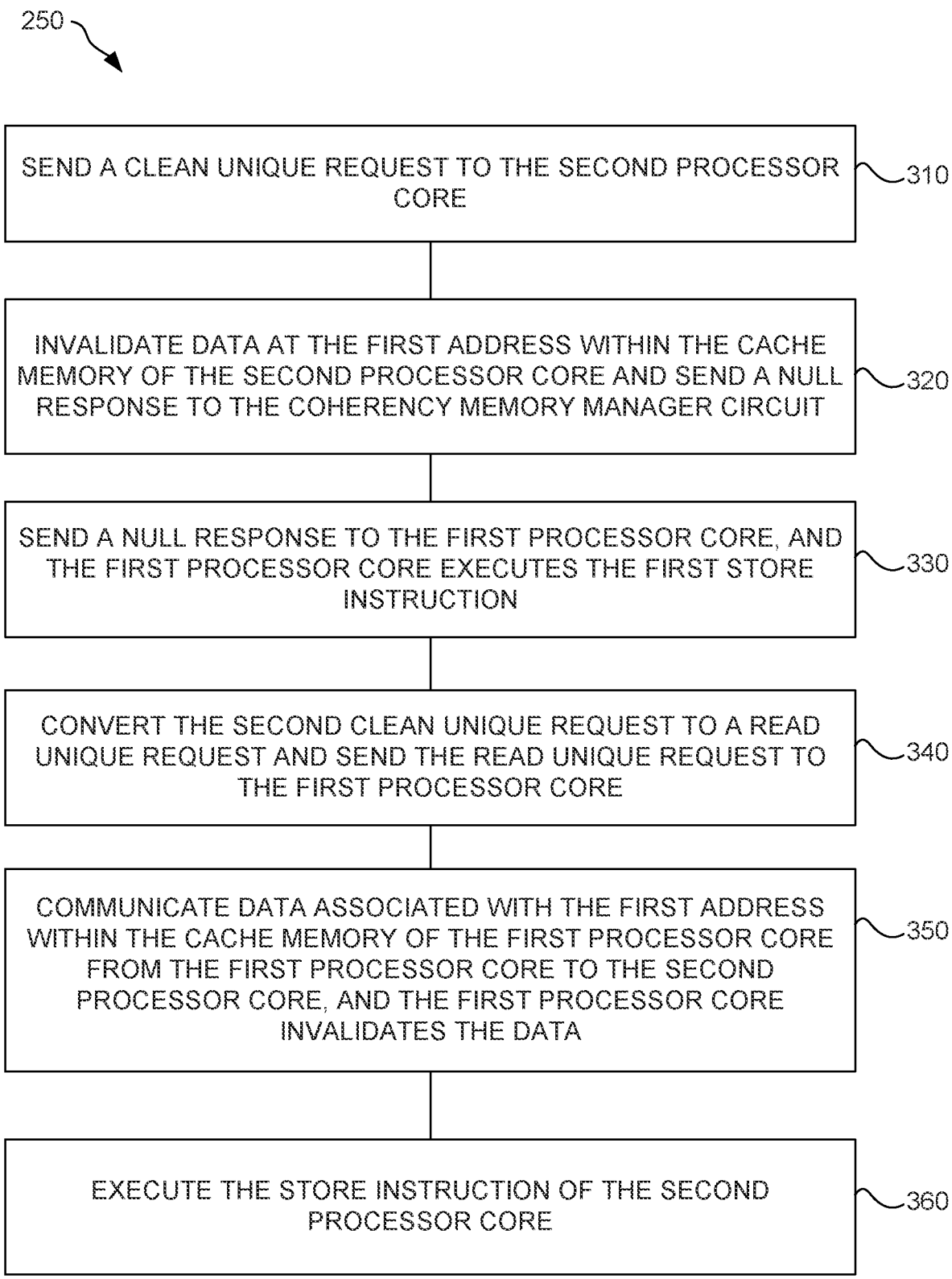
FIG. 3 depicts a flowchart of a method for converting and processing transactions between processor cores and a memory coherency manager circuit, according to one or more example.

In one or more examples, at the completion of 360, the memory coherency manager circuit 130 converts the third clean unique request 430 to a read unique request, and 350 and 360 of FIG. 3 are performed by the processor core $110_3$. For example, read unique requests are output to the processor cores $110_1$, $110_2$, and $110_4$. As the cache memory $114_2$ has data associated with the memory address A', the processor core $110_2$ outputs the data to the processor core $110_3$ (either through the memory coherency manager circuit 130, or externally to the memory coherency manager circuit 130), and the processor core $110_3$ executes the corresponding store instruction. The processor core $110_2$ invalidates the copy of the data stored within the cache memory $114_2$.

Further, the memory coherency manager circuit 130 converts the fourth clean unique request 440 to a read unique request, and 350 and 360 of FIG. 3 are performed by the processor core $110_4$. For example, read unique requests are output to the processor cores $110_1$, $110_2$, and $110_3$. As the cache memory $114_3$ has data associated with the memory address A', the processor core $110_3$ outputs the data to the processor core $110_4$ (either through the memory coherency manager circuit 130, or externally to the memory coherency manager circuit 130), and the processor core $110_4$ executes the corresponding store instruction. The processor core $110_3$ invalidates the copy of the data stored within the cache memory $114_2$. When the processor core 110 outputs data based on receiving a read unique request, that processor invalidates the data within the corresponding cache memory as the data is no longer the most update version. Further, when a processor core 110 receives data (e.g., dirty data) from another processor core, the processor core invalidates the corresponding data stored within the respective cache memory, and uses the received data to execute the store instruction.

In one or more examples, if a processor core 110 receives a null response from each other processor core 110, the processor core 110 has exclusive access to the corresponding address within the memory 140, and executes the corresponding committed store instruction.

Figure 8:
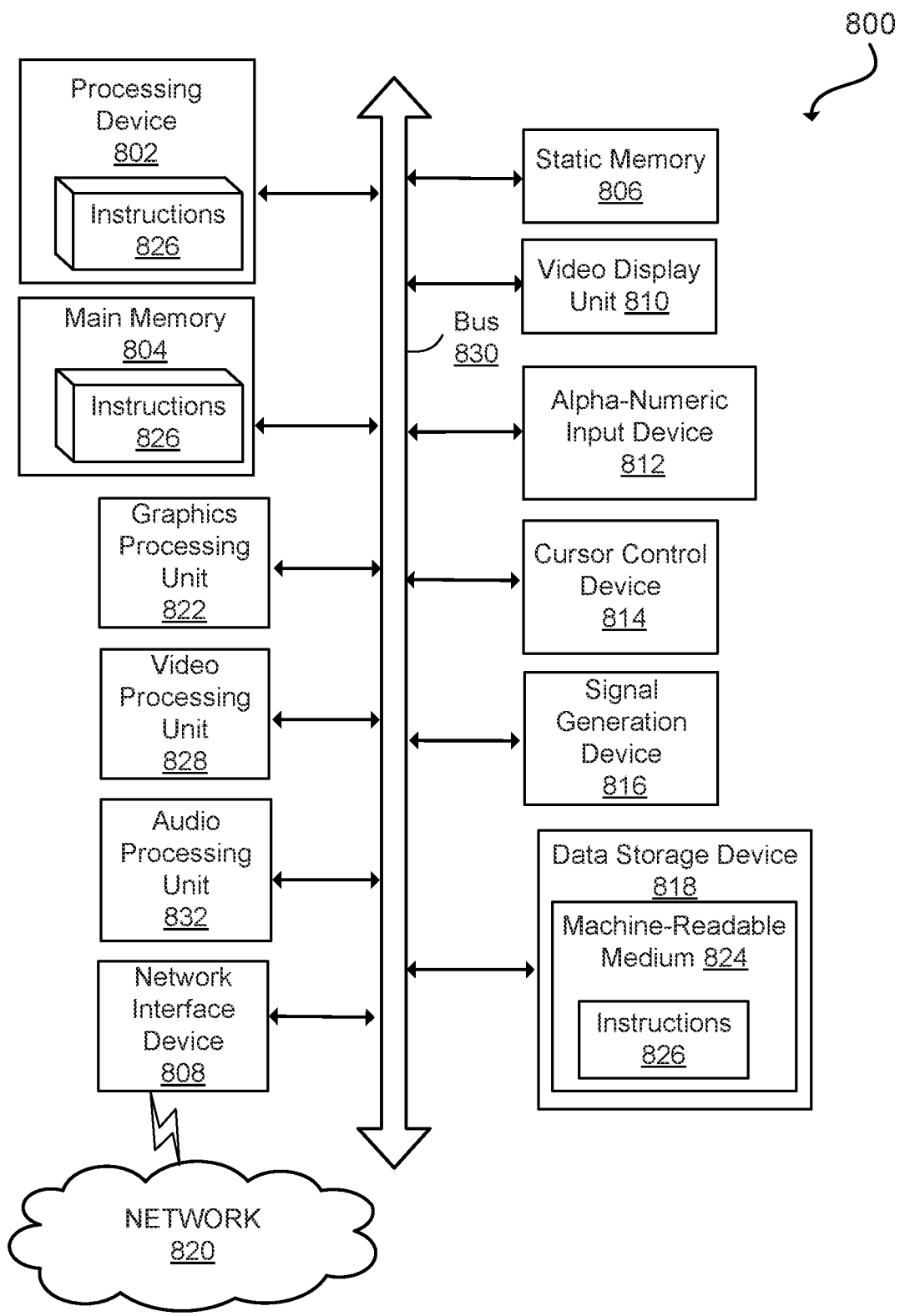
FIG. 8 depicts a diagram of an example computer system in which embodiments of the present disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
    receiving a first clean unique request from a first processor core and a second clean unique request from a second processor core, wherein the first clean unique request and the second clean unique request respectively indicate that the first processor core and second processor core request access to a first address of a memory coupled to the first processor core and the second processor core;

determining, within a memory coherency manager circuit, that the first clean unique request and the second clean unique request are associated with the first address; and converting the second clean unique request into a first read unique request based on determining that the first clean unique request and the second clean unique request are associated with the first address, wherein the first read unique request indicates that the second processor core requests data associated with the first address.

2. The method of claim 1, wherein the first processor core is associated with a first cache memory and the second processor core is associated with a second cache memory, and wherein the method further comprises:

outputting the first clean unique request to the first processor core, wherein data associated with the first address is invalidated within the second cache memory based on receiving the first clean unique request; and outputting a null response from the second processor core to the first processor core based on invalidating the data associated with the first address in the second cache memory.

3. The method of claim 1 further comprising outputting the first read unique request to the first processor core, wherein the first processor core outputs data associated with the first address to the second processor core based on receiving the first read unique request.

4. The method of claim 1 further comprising outputting the first read unique request to a third processor core, wherein the third processor core outputs a null response to the memory coherency manager circuit based on receiving the first read unique request.

5. The method of claim 4 further comprising:

receiving a third clean unique request from the third processor core; and converting the third clean unique request to a second read unique request.

6. The method of claim 5 further comprising outputting the second read unique request to the first processor core, and the second processor core, wherein the second processor core outputs data associated with the first address to the third processor core based on receiving the second read unique request.

7. The method of claim 6, further comprising outputting a null response by the first processor core to the memory coherency manager circuit based on receiving the second read unique request.

8. A processing system comprising:

a memory;

processor cores coupled to the memory, the processor cores comprising:

a first processor core configured to output a first clean unique request associated with a first address within the memory, wherein the first clean unique request indicates that that the first processor core requests access to the first address; and a second processor core configured to output a second clean unique request associated with the first address, wherein the second clean unique request indicates that that the second processor core requests access to the first address; and a memory coherency manager circuit configured to:

receive the first clean unique request and the second clean unique request;

determine that the first clean unique request and the second clean unique request are associated with the first address; and convert the second clean unique request into a first read unique request, wherein the first read unique request indicates that the second processor core requests data associated with the first address.

9. The processing system of claim 8, wherein the memory coherency manager circuit is further configured to:

output the first clean unique request to the first processor core, wherein data associated with the first address is invalidated within a second cache memory of the second processor core based on receiving the first clean unique request, and wherein the second processor core is configured to:

output a null response from the second processor core to the first processor core based on invalidating the data associated with the first address in the second cache memory.

10. The processing system of claim 8, wherein the memory coherency manager circuit is further configured to output the first read unique request to the first processor core, wherein the first processor core outputs data associated with the first address to the second processor core based on receiving the first read unique request.

11. The processing system of claim 8, wherein the memory coherency manager circuit is further configured to output the first read unique request to a third processor core of the processor cores, wherein the third processor core is configured to output a null response to the memory coherency manager circuit based on receiving the first read unique request.

12. The processing system of claim 11, wherein the third processor core is further configured to output a third clean unique request, and wherein the memory coherency manager circuit is further configured to convert the third clean unique request to a second read unique request.

13. The processing system of claim 12, wherein the memory coherency manager circuit is further configured to output the second read unique request to the first processor core, and the second processor core, wherein the second processor core is further configured to output data associated with the first address to the third processor core based on receiving the second read unique request.

14. The processing system of claim 13, wherein the first processor core is configured to output a null response to the memory coherency manager circuit based on receiving the second read unique request.

15. A memory coherency manager circuit configured to:

receive a first clean unique request from a first processor core and a second clean unique request from a second processor core, wherein the first clean unique request and the second clean unique request respectively indicate that the first processor core and second processor core request access to a first address of a memory coupled to the first processor core and the second processor core;

determine that the first clean unique request and the second clean unique request are associated with the first address; and convert the second clean unique request into a first read unique request based on determining that the first clean unique request and the second clean unique request are associated with the first address, wherein the first read unique request indicates that the second processor core requests data associated with the first address.

16. The memory coherency manager circuit of claim 15, wherein the first processor core is associated with a first cache memory and the second processor core is associated with a second cache memory, and wherein the memory coherency manager circuit is further configured to:
- output the first clean unique request to the first processor core, wherein data associated with the first address is invalidated within the second cache memory based on receiving the first clean unique request; and
- output a null response from the second processor core to the first processor core based on invalidating the data associated with the first address in the second cache memory.

17. The memory coherency manager circuit of claim 15, wherein the memory coherency manager circuit is further configured to output the first read unique request to the first processor core, wherein the first processor core is configured to output data associated with the first address to the second processor core based on receiving the first read unique request.

18. The memory coherency manager circuit of claim 15, wherein the memory coherency manager circuit is further configured to output the first read unique request to a third processor core, wherein the third processor core is configured to output a null response to the memory coherency manager circuit based on receiving the first read unique request.

19. The memory coherency manager circuit of claim 18 further configured to:
- receive a third clean unique request from the third processor core; and
- convert the third clean unique request to a second read unique request.

20. The memory coherency manager circuit of claim 19, wherein the memory coherency manager circuit outputs the second read unique request to the first processor core, and the second processor core, wherein the second processor core outputs data associated with the first address to the third processor core based on receiving the second read unique request.

* * * * *